C. W. JENKINS.
AUXILIARY AIR AND WATER SUPPLYING DEVICE.
APPLICATION FILED JAN. 25 1919. RENEWED APR. 21, 1920.
1,351,170.
Patented Aug. 31, 1920.
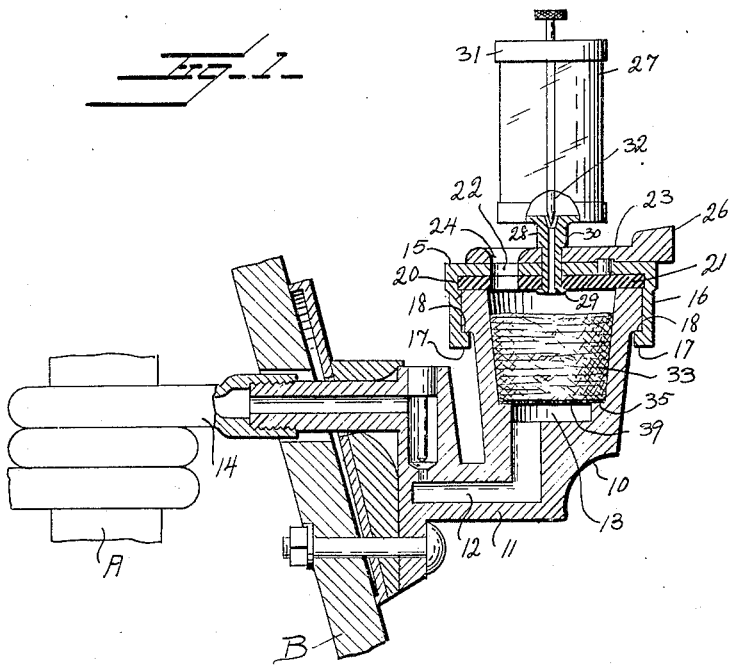
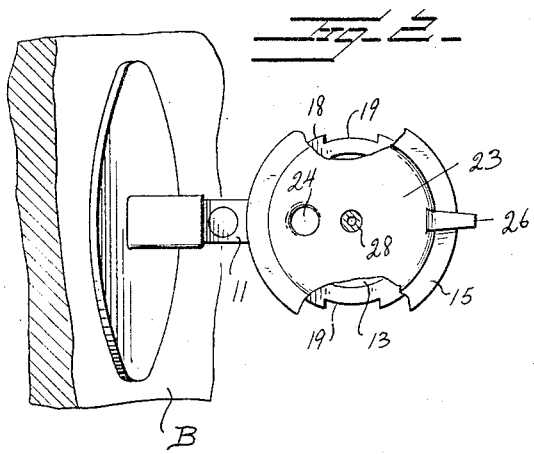
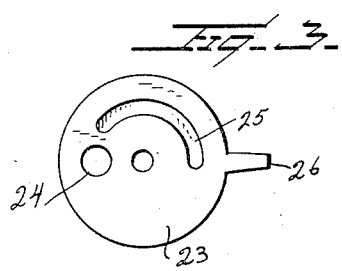
Inventor
C. W. Jenkins
By Watson E. Coleman
Attorney

UNITED STATES PATENT OFFICE.

CHARLES W. JENKINS, OF ELLERSON, VIRGINIA, ASSIGNOR OF ONE-HALF TO LEE B. HANCOCK, OF RICHMOND, VIRGINIA.

AUXILIARY AIR AND WATER SUPPLYING DEVICE.

1,351,170.      Specification of Letters Patent.      Patented Aug. 31, 1920.

Application filed January 25, 1919, Serial No. 273,158. Renewed April 21, 1920. Serial No. 375,651.

*To all whom it may concern:*

Be it known that I, CHARLES W. JENKINS, a citizen of the United States, residing at Ellerson, in the county of Hanover and State of Virginia, have invented certain new and useful Improvements in Auxiliary Air and Water Supplying Devices, of which the following is a specification, reference being had to the accompanying drawings.

This invention relates to automobile attachments or attachments for use with internal combustion engines, and particularly to means for controllably admitting auxiliary air to the manifold of an internal combustion engine.

The general object of the present invention is to provide a device of this character so constructed that auxiliary air may be admitted to the manifold and also so formed that water or other liquid may be admitted from time to time in conjunction with the air.

A further object is to provide a device of this character having a liquid container or chamber mounted upon a cup-shaped body and designed to contain fibrous straining material, there being a valve controlling the flow of liquid from the container into said cup-shaped body and there being a valve controlling the admission of air into the cup-shaped body, said body being operatively connected to the manifold of an engine.

A further object is to provide a structure of this character in which the auxiliary air or the mixture of air and liquid may be heated prior to its entrance into the manifold and specifically to cause the outlet pipe from the cup-shaped strainer body to be disposed in conjunction with or be disposed to encircle a number of times the exhaust pipe of the automobile to thereby heat the vapor passing through the pipe.

Other objects have to do with the details of construction and arrangements as will hereinafter appear.

My invention is illustrated in the accompanying drawings, wherein:—

Figure 1 is a vertical sectional view of my auxiliary air and water supplying device, and a view also showing a portion of the instrument board of a vehicle;

Fig. 2 is a top plan view of the construction shown in Fig. 1, the cap and the disk 23 being partly broken away; and Fig. 3 is an under side plan view of the disk 23.

Referring to these drawings, it will be seen that my improved auxiliary air device comprises a body 10, which is approximately cup-shaped in form and is open at its upper end, and is provided with a laterally extending stem 11 having therein a duct 12 leading from the cup-shaped chamber 13 of the body through the stem, and from this stem extends a pipe 14 which is caused to encircle or is coiled around the exhaust pipe A of an engine before the pipe 14 enters the manifold of the engine. The cup-shaped body is intended to be mounted upon the instrument board B of the automobile or in any other suitable position, the stem of the body extending through the instrument board.

Adapted to close the upper end of the body 10 and lock thereon is a cap 15 having a marginal wall 16 adapted to snugly fit the upper end of the body 10 and having at diametrically opposite points inwardly projecting lugs 17 which are adapted for engagement with a flange 18 formed upon the upper end of the body 10, this flange being cut away at two points, as at 19, for the passage of said lugs. In disposing this cap upon the upper end of the body 10, the lugs 17 are passed downwardly through the notches 19 and then the cap is given a half turn which locks the cap upon the body 10. This cap 15 is counterbored to provide an annular groove 20 at the juncture of its top wall with the side wall thereof, and disposed against the inner face of the top wall is a leather washer or disk 21 which is adapted to seat upon the upper edge of the wall or chamber 13 and prevent the entrance of air between the cap and the chamber wall.

The cap 15 or closure is provided at one side of its center with an air inlet opening 22 and the washer 21 is likewise provided with a registering opening. Mounted upon the cap or closure for rotation around the central pivot is a valve disk 23 having therein a port 24 adapted to register with the opening 22 or be shifted out of registration therewith, the cap 15 being provided with a stop pin engaging in an arcuate groove 25 on the inner face of the valve disk 23. This valve disk is provided with a projecting portion 26 whereby it may be readily shifted.

For the purpose of providing a container or containing reservoir or cup for liquid to be supplied to the chamber 13 and also to provide means for rotatably supporting or mounting the valve upon the cap, I provide a liquid containing cup 27 which may be made of brass, aluminum, glass, or any other suitable material, the lower end of this cup being formed with a tubular stem 28 which passes through the valve 23, the top of the cap 15, and the washer, 21, and is outwardly flanged at its lower end, as at 29, this stem being also provided with a shoulder 30 against which the valve bears and which holds the valve in close contiguity to the upper surface of the cap 15. The upper end of the cup-shaped chamber 27 is closed by a cover 31 having detachable engagement with the wall of the chamber 27. Through this cover 31 is a needle valve 32 which coacts with a needle valve seat formed in the upper portion of the tubular stem 28. The upper end of the valve stem 32 is provided with a knurled head whereby it may be rotated to adjust the needle valve properly, and it is obvious that this stem might be also provided with an index pointer with index marks on the cover 31 so as to indicate the degree of opening or closing of the needle valve. By means of this needle valve the amount of liquid which will flow by gravity from the chamber 27 into the chamber 13 may be delicately regulated or the flow cut off entirely.

Preferably there is disposed within the chamber 13 a mass of fibrous or textile fabric in the nature of wicking and designated 33 which rests upon a reticulated or perforated plate 39, in turn resting on shoulders 35 formed on the lower end of the cup-shaped chamber. This mass of wicking or the like material acts as a strainer and also acts to atomize any liquid which may be disposed in the chamber and mix it thoroughly with the air and carburet the air if the liquid is in the nature of kerosene, alcohol, gasolene or other liquid hydrocarbon, this mixed liquid and air being drawn through the duct 12 and through the pipe 14 on the suction stroke of the engine.

It is obvious that whenever desired a few drops of liquid from the container 27 may be allowed to flow down onto the absorbent material in chamber 13 and then upon the suction stroke of the engine this liquid mixed with air will be drawn into the engine cylinders. Thus the container 27 might hold priming liquid, such as gasolene, kerosene, alcohol or the like, and the device be used entirely for priming the engine. On the other hand, it may hold water so that when desired water vapor may be drawn into the engine upon the suction stroke thereof. It is possible, of course, with this construction to prevent the entrance of liquid to the chamber 13 from container 27 and, if the fibrous wicking be dry within the chamber, then only fresh auxiliary air will be drawn in unmixed with vaporized liquid. With the needle valve closed and the air valve open, it is obvious that a very few strokes of the piston will withdraw all water from the absorbent material so that the latter will be dry even if it has previously been soaked with liquid.

It will be noticed that the feed is a gravity feed from container 27 and that furthermore as the pipe 14 encircles the exhaust pipe, the atomized liquid is thoroughly heated before its entrance into the manifold of the engine and its entrance into the cylinders and thus that the vapor is placed in the very best condition for use. Of course, where the container 27 is intended to hold water for cooling the engine by the introduction of water vapor, the pipe 14 will not surround or be connected to the exhaust pipe, but under ordinary circumstances where it is simply desired to introduce vapor of some liquid, as water, kerosene, alcohol, or other hydrocarbon, then it is most desirable that the vapor of these liquids shall be heated before its introduction into the engine manifold.

While I have illustrated the details of construction of my device and certain arrangements of parts, it will be understood that this may be modified in many ways without departing from the spirit of the invention as defined in the appended claims.

I claim:—

1. An auxiliary air device comprising a chamber having an outlet at one end, a cover detachably closing the opposite end of the container, and having an air inlet opening, a liquid container having a tubular stem extending through the cover and mounted thereon, a rotatable air valve through which said stem passes, the stem forming a pivot for the valve, and a needle valve passing through the container and controlling the outlet through said tubular stem.

2. An auxiliary air device comprising a cup-shaped chamber open at its upper end and having an outlet stem leading from its lower end and adapted to contain a mass of absorbent material, a cover detachably closing the upper end of the chamber and having an air inlet opening, a liquid container having a tubular outlet stem discharging through the cover and formed to provide a needle valve seat, a needle valve passing through the container and coacting with the seat, and a rotatable valve disk mounted upon the cover of the chamber and having an opening adapted to register with the air inlet opening of the chamber, said stem constituting a pivot upon which said valve disk rotates.

3. An auxiliary air device comprising a cup-shaped chamber having an outlet duct at its lower end and open at its upper end and adapted to contain a mass of absorbent material, a cap therefor detachably engaging the wall of the chamber and having an air inlet opening at one side of its center, a yielding washer disposed upon the inside face of the cap, a valve disk disposed against the outside face of the cap, the washer and valve disk having openings registering with the air opening through the cap, and a liquid container having a tubular stem extending through the valve disk, cap, and the washer and connecting these parts and affording a pivot for the valve disk, the container having a cap and a valve controlling the outlet through the tubular stem.

In testimony whereof I hereunto affix my signature in the presence of two witnesses.

CHARLES W. JENKINS.

Witnesses:
LILLIE HINNANT BURTON,
JAS. M. TAYLOR.